(12) United States Patent
Nguyen et al.

(10) Patent No.: US 11,561,697 B2
(45) Date of Patent: Jan. 24, 2023

(54) DISAGGREGATED MEMORY SERVER HAVING CHASSIS WITH A PLURALITY OF RECEPTACLES ACCESSIBLE CONFIGURED TO CONVEY DATA WITH PCIE BUS AND PLURALITY OF MEMORY BANKS

(71) Applicant: TORmem Inc., San Jose, CA (US)

(72) Inventors: Thao Nguyen, San Jose, CA (US);
Steven White, San Jose, CA (US);
Scott Burns, San Jose, CA (US)

(73) Assignee: TORmem Inc., San Jose, CA (US)

( * ) Notice: Subject to any disclaimer, the term of this patent is extended or adjusted under 35 U.S.C. 154(b) by 0 days.

(21) Appl. No.: 17/743,277

(22) Filed: May 12, 2022

(65) Prior Publication Data

US 2022/0365676 A1    Nov. 17, 2022

Related U.S. Application Data

(60) Provisional application No. 63/187,754, filed on May 12, 2021, provisional application No. 63/225,258, filed on Jul. 23, 2021.

(51) Int. Cl.
*G06F 3/06* (2006.01)
*G06F 13/42* (2006.01)

(52) U.S. Cl.
CPC ............ *G06F 3/061* (2013.01); *G06F 3/0655* (2013.01); *G06F 3/0683* (2013.01); *G06F 13/4221* (2013.01); *G06F 2213/0026* (2013.01)

(58) Field of Classification Search
CPC ...... G06F 3/061; G06F 3/0655; G06F 3/0683; G06F 13/4221
See application file for complete search history.

(56) References Cited

U.S. PATENT DOCUMENTS

| 10,509,746 | B2 * | 12/2019 | Tashima | G06F 13/22 |
|---|---|---|---|---|
| 2008/0259555 | A1 * | 10/2008 | Bechtolsheim | G06F 13/409 361/725 |
| 2019/0187909 | A1 | 6/2019 | Pinto et al. | |
| 2020/0356515 | A1 | 11/2020 | Olarig et al. | |
| 2021/0280248 | A1 * | 9/2021 | Ridgley | H05K 7/1492 |

FOREIGN PATENT DOCUMENTS

| WO | 2016145049 A1 | 9/2016 |
|---|---|---|
| WO | 2018102443 A1 | 6/2018 |

OTHER PUBLICATIONS

International Search Report and Written Opinion in related international application PCT/US2022/029048 dated Aug. 19, 2022, pp. 1-10.

* cited by examiner

*Primary Examiner* — Tammara R Peyton
(74) *Attorney, Agent, or Firm* — Pillsbury Winthrop Shaw Pittman, LLP

(57) ABSTRACT

Provided is a disaggregated memory server, which in some examples is a rack-mounted hardware appliance comprising a pool of memory for allocation to memory clients. Examples of memory clients may include one or more rack-mounted computing devices co-located on a rack with the disaggregated memory server. The disaggregated memory server may be optimized for high-speed dynamic memory allocation to the other computing devices in the rack.

30 Claims, 8 Drawing Sheets

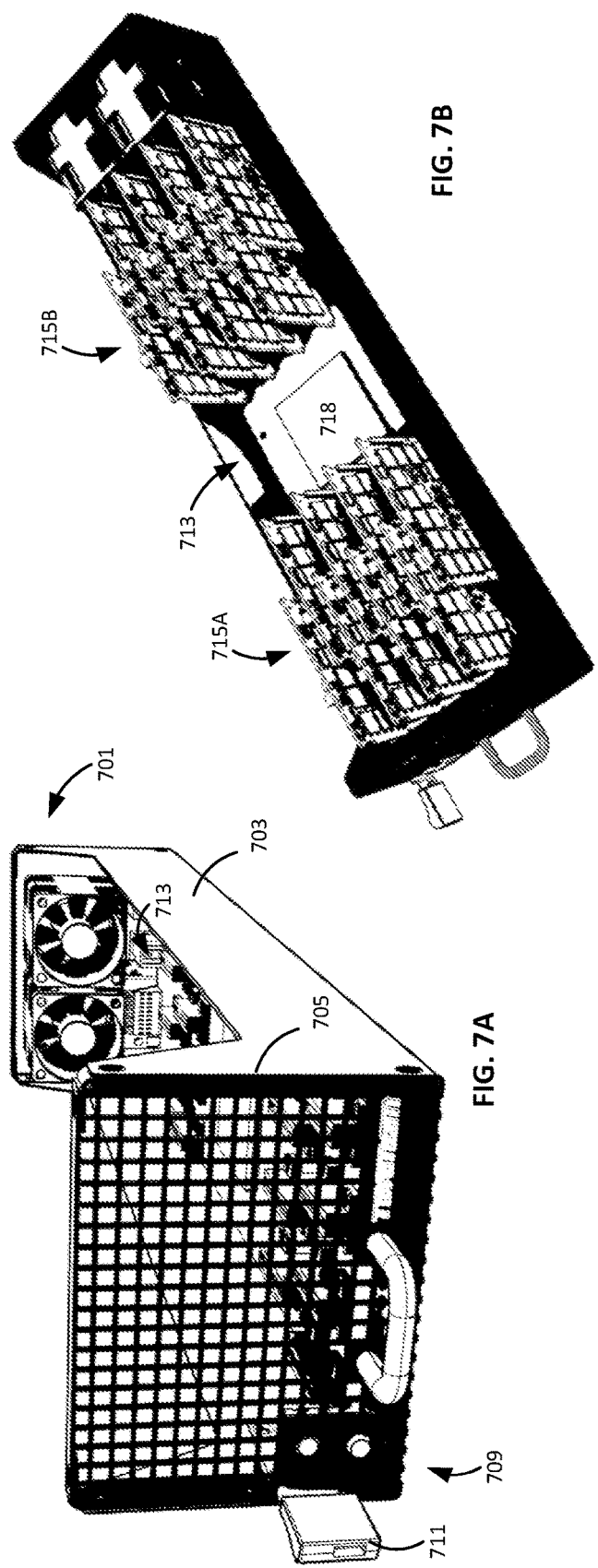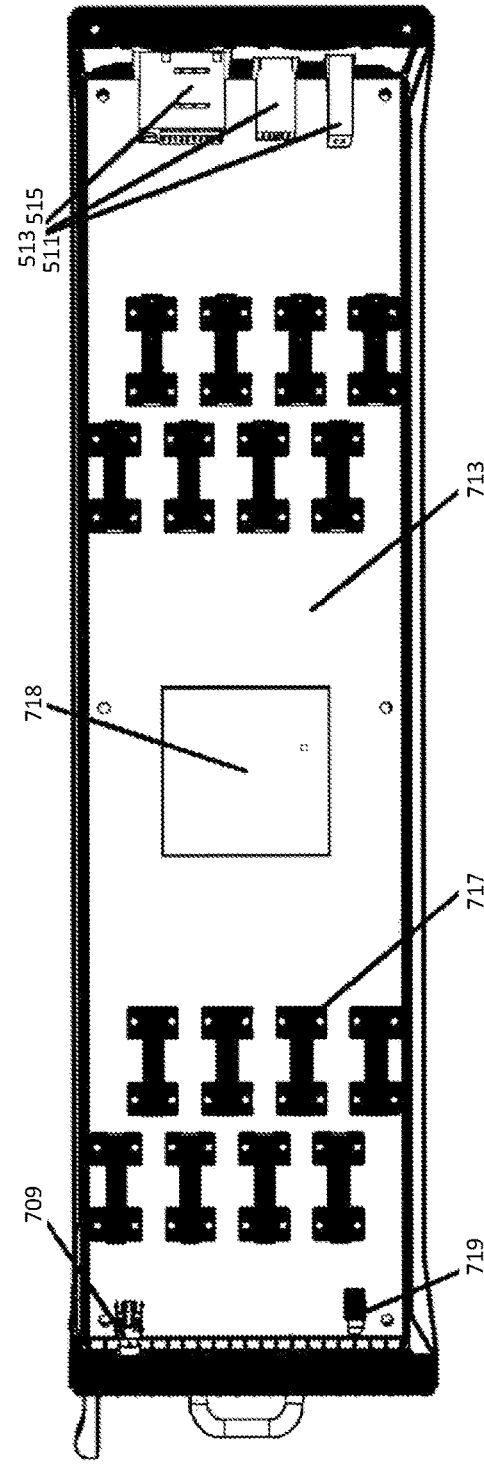

DISAGGREGATED MEMORY SERVER HAVING CHASSIS WITH A PLURALITY OF RECEPTACLES ACCESSIBLE CONFIGURED TO CONVEY DATA WITH PCIE BUS AND PLURALITY OF MEMORY BANKS

CROSS-REFERENCE TO RELATED APPLICATIONS

The present application claims the benefit of U.S. Provisional Application No. 63/187,754, filed 12 May 2021, titled Disaggregated Memory Server, and U.S. Provisional Application No. 63/225,258, filed 23 Jul. 2021, titled Disaggregated Memory Server. Each aforementioned patent filing is incorporated by reference herein in its entirety.

BACKGROUND

1. Field

The present disclosure relates generally to computing architecture and, more specifically, to disaggregated memory servers.

2. Description of the Related Art

Often, it is useful for collections of computers to access some shared repository of program state. Examples include shared state accessed by a collection of computing devices implementing a distributed application. The shared state can often be stored in persistent or non-persistent memory. Typically, the computing devices access this shared state via a network, like Ethernet, Infiniband, fiber channel, or other networks. In some cases, the shared state is stored in persistent storage of a remote computing device, like a hard drive or solid-state drive, or in some cases, the shared state is stored in system memory (like random access memory) accessed with techniques like remote direct memory access.

SUMMARY

The following is a non-exhaustive listing of some aspects of the present techniques. These and other aspects are described in the following disclosure.

Some aspects include a disaggregated memory server is a top-of-rack (TOR) hardware appliance that is optimized for high-speed dynamic memory allocation to other servers in the rack.

Some aspects include a device, including: a chassis configured to be mounted in a server rack; a plurality of memory controllers coupled to a system board mounted to the chassis; a plurality of cables coupled to the plurality of memory controllers via the system board, each of the cables having a different Peripheral Component Interconnect Express bus; a plurality of dual in-line memory module (DIMM) slots configured to place memory modules in communication with the memory controllers; and one or more processors and system memory coupled to the plurality of memory controllers via the system board, wherein the system memory stores instructions that when executed by at least some of the one or more processors effectuate operations comprising: receiving a first request to allocate a first subset of memory coupled to the DIMM slots to a first computing device coupled to a first cable among the plurality of cables and, in in response, causing memory access requests received via the first cable to be serviced by the first subset of memory; and receiving a second request to allocate a second subset of memory coupled to the DIMM slots to a second computing device coupled to a second cable among the plurality of cables and, in in response, causing memory access requests received via the second cable to be serviced by the second subset of memory.

Some aspect include a server-device, including: a chassis configured to be mounted in a server rack; a circuit board configured to convey Peripheral Component Interconnect Express (PCIe) bus data between first connection interfaces and second connection interfaces coupled to the circuit board, the circuit board mounted to the chassis; a plurality of memory controllers coupled to the circuit board via the first connection interfaces, the first connection interfaces configured to convey PCIe bus data between respective memory controllers and the circuit board, the second connection interfaces configured to convey PCIe bus data between the circuit board and respective PCIe buses of other computing devices; a plurality of banks of dual in-line memory module (DIMM) slots configured to place a memory received in a slot in communication with one of the memory controllers; and one or more processors and system memory coupled to the plurality of memory controllers via the circuit board.

Some aspects include a computer-implemented process or method for allocating memory to computing devices by a memory server, including: receiving, by one or more processors of the memory server, a first request from a first computing device for an amount of memory to be made available to the first computing device on a Peripheral Component Interconnect Express (PCIe) bus of the first computing device; allocating, by one or more processors of the memory server, a first subset of memory coupled to dual in-line memory module (DIMM) slots managed by a memory controller to the first computing device, the first computing device coupled to the memory controller by a first cable among a plurality of cables coupled to respective computing devices, the memory controller placing in communication, in response to the allocating, the first computing device with the first subset of memory; receiving, by one or more processors of the memory server, a second request from a second computing device for an amount of memory to be made available to the second computing device on a PCIe bus of the second computing device; and allocating, by one or more processors of the memory server, a second subset of memory coupled to DIMM slots managed by the memory controller to the second computing device, the second computing device coupled to the memory controller by a second cable among the plurality of cables coupled to respective computing devices, the memory controller placing in communication, in response to the allocating, the second computing device with the second subset of memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 7A, FIG. 7B, and FIG. 7C illustrate examples of a memory module of a disaggregated memory server in accordance with some example embodiments.

Figure 1:
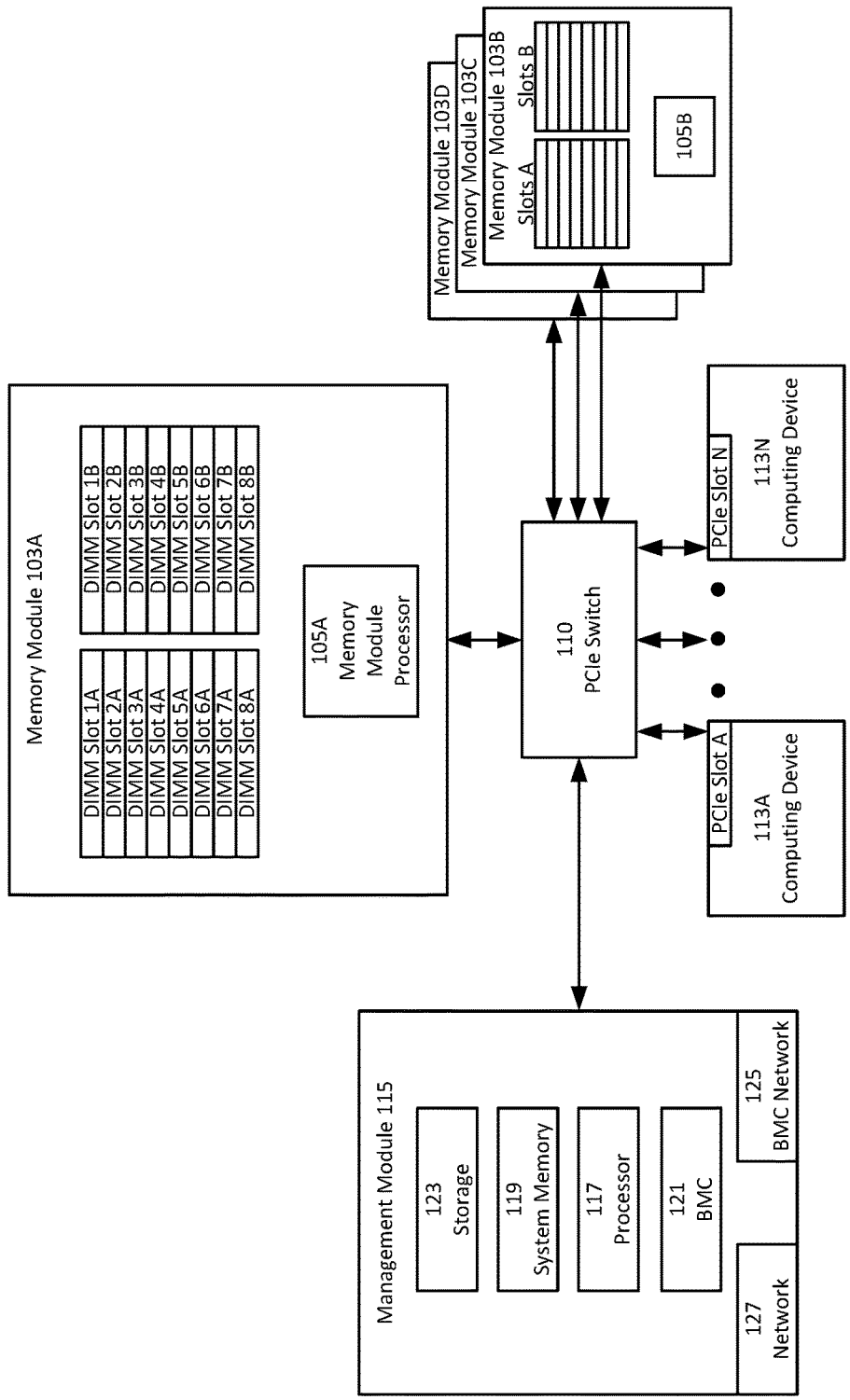
FIG. 1 illustrates an example disaggregated memory server architecture by which the present techniques may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer engineering. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Generally, existing approaches to sharing state among a plurality of computing devices are too slow, both in terms of time-to-first byte access and bandwidth. Often, using approaches like those discussed above, data must pass through the networking stack of two different computers on either end of a request, passing at each end through the Ethernet Physical Layer (PHY), Media Access Control (MAC) Address, Network Interface Controller (NIC) FIFO buffers, and NIC driver of computers on both ends, before or after being exchanged with a process bound to the appropriate network socket. In turn, a response also passes through the network stack of each of the computers. Approaches using Remote Direct Memory Access (RDMA) exchanges can generally face similar challenges as requests and responses typically pass through the first four of these stages. Exchanges like those noted above that pass through the network stack of (e.g., multiple) computing devices on the request and response path can impose substantial delays and limit bandwidth. By way of reference within the context of an example computing system, accessing L1 cache of a processor typically takes on the order of 0.5 ns, L2 cache 7 ns, and main system memory of a computing system 100 ns, while it can take around 10,000 ns to send data over a 1 Gbps network and over 100,000 ns to access data in a local solid state drive. None of which should be taken to suggest such approaches are disclaimed, as the present techniques may also be used in combination with these earlier technologies.

Other issues with existing approaches include a lack of flexibility. Generally, it is too slow to dispatch a technician to install additional system memory, like a Dual-Inline Memory Module (DIMM), within a computing system when a given process has a short-term need to increase memory capacity. Moreover, for longer term needs, a set of lower capacity DIMMs may often need to be replaced with a set of higher capacity DIMMs when each available DIMM slot is in use by the set of lower capacity DIMMs (e.g., another a lower capacity DIMM cannot be added). While virtual machine instances can typically be elastically scaled according to demand, memory resources accessible to a given machine are generally fixed on the relevant time scales. Indeed, the need to dynamically dispatch memory can also arise in monolithic applications executing on a single computing device, e.g., when training a machine learning model with more parameters than could otherwise be held in memory, and for which accessing storage is too slow.

To mitigate these and other issues, some embodiments implement a disaggregated memory server that provides on-demand memory access to other computing devices. In some cases, a plurality of different computing devices (e.g., rack-mounted servers) may access (e.g., read or write) data stored in memory of the disaggregated memory server, in some embodiments, without the exchanges passing through the networking stack of the computing devices or the disaggregated memory server. In some cases, the remote memory of the disaggregated memory server may appear to the operating system of the computing device as local memory, in some cases, within a physical address space of the computing device. In some embodiments, data exchanges (e.g., like requests and responses) occur via a respective Peripheral Component Interconnect Express (PCIe) 4, 5, or 6 bus that couples the disaggregated memory server to the computing device. In some examples, a plurality of PCIe busses couples the disaggregated memory server to respective computing devices that connect in parallel to the disaggregated memory server, e.g., one, two, or more per computing devices with 8, 16, or more lanes per bus.

FIG. 1 illustrates an example disaggregated memory server architecture 100. The architecture 100 of a disaggregated memory server ("memory server") may include one or more memory modules 103, one or more management modules 115, and a PCIe Switch 110. Implementations of the architecture 100, such as in example rack-mount use cases, may further include one or more computing devices 113 coupled to the memory server and which access the disaggregated memory of the one or more memory modules 103.

The disaggregated memory server may provide accelerated access to a large bank of memory of the one or more memory modules 103 to memory clients, such as various computing devices 113. In various example embodiments, the computing devices 113 (e.g., memory clients) and the memory server may be co-located on a rack or located physically proximate to the memory server (e.g., within 30, 15, 10, or 5 or fewer meters). Other configurations utilizing longer communication paths should be construed as disclaimed as performance tradeoffs resulting from such a configuration may be acceptable in some use cases.

In some embodiments, the memory server may be within a threshold distance, such as within 2 meters of signal path along a bus by which the computing devices 113 are coupled to the memory server. Some embodiments may implement an architecture 100 like that depicted in FIG. 1, e.g., with a central PCIe switch 110 having a plurality of lanes, like 40, 60, 80, or 100 or more lanes, such as a generation 4, 5, or 6 PCIe switch. PCIe 4 is expected to afford lower performance, but at a lower price point, while PCIe 5 and 6 are expected to afford higher performance, albeit at greater cost, at least initially. In some embodiments, the PCIe switch 110 may communicate with a plurality of Field Programmable Gate Arrays FPGAs (or Application Specific Integrated Circuits ASICs) of memory modules 103 that operate as memory controllers for respective subsets of the illustrated memory slots (e.g., DIMM slots). In some cases, signaling between one or more components (e.g., memory modules 103, computing devices 113, etc.) coupled to the PCIe Switch 110 may be implemented with non-return-to-zero (NRZ) line coding or 4-level pulse-amplitude modulation and forward error correction.

As shown, a management module 115 may include a processor 117, system memory 119, a baseband management controller (BMC) 121, and storage 123. The management module 115 may include a PCIe interface or bus by which the management module is coupled to the PCIe Switch 110. For example, the management module 115 may include a 4, 8, or 16 (or more) lane PCIe bus that is coupled to the PCIe Switch 110. Additionally, the management module 115 may further include one or more network interfaces, like a baseband management network 125 interface (e.g., for out-of-band management of the memory server) and a network 127 interface (e.g., for in-band communications over an ethernet or other in-band data network).

A management module 115 may operate in a central control role for a memory server, which may include at least one management module. In some examples, a management module 115 may be implemented on a back-plane of a chassis of the memory server. In other examples, a management module 115 may be implemented in a hot-swappable chassis that may be inserted in a front of a chassis of the memory server and couple to a back-plane of the chassis. Some example configurations may implement two management modules 115, like in a primary and secondary role, to provide redundancy of operation. For example, an embodiment may implement a management module 115 on a back-plane of a chassis and the chassis may further receive a second management module (e.g., optionally) via a front of the chassis.

In some example embodiments, a management module 115 communicates with one or more memory modules 103 across a PCIe (×4 or more) connection to PCIe Switch 110. The PCIe Switch 110 may be implemented on a back-plane of a chassis of the memory server. For example, a back-plane tray of a chassis of the memory server may receive a PCIe Switch backplane PCB which provides back-plane connections to one or more modules (e.g., 103, 115) inserted from the front of the chassis. The PCIe signaling between the modules 103, 115 and devices 113 coupled to the PCIe Switch 110 may pass through high-speed data connections (e.g., PCIe×4 or more) that facilitate signaling on a PCIe bus. In some examples, computing devices 113 and memory modules 103 may be coupled to the PCIe Switch 110 via 16 lane PCIe bus connections, thus affording communications over a high-speed bus. Example busses may be "high-speed bus" if they have a throughput bandwidth of 12 GB/s or more. Some embodiments of a PCIe bus may support 12 Gb/s, 25 Gb/s or 32 Gb/s or more throughput bandwidth. Some embodiments may only use a subset of the capability of a high-speed bus.

In some example embodiments, a management module 115 includes a processor 117 and system memory 119 (e.g., like random access memory) by which the management module may execute operations to manage one or more memory modules 103 and access of computing devices 113 to memory of the memory modules. The management module 115 may include a storage 123, like one or more hard-disk drives or non-volatile memory drives, which may store computer program code that may be loaded into system memory 119 and executed by the processor 117. Results of the processing, system state, operating system, or other data may be stored to the storage 123.

In some examples, the processor 117 may execute instructions to perform dynamic, scalable memory allocation of subsets of memory of one or more memory modules 103 to the different computing devices 113, in some cases, responsive to requests via an application programming interface (API). Such an API may receive requests and return responses via one or more of the network interfaces 125, 127, such as depending on implementation of such requests in-band, out-of-band, or both.

In some examples, a computing device 113, like a computing device 113A, may request an amount of memory to be allocated by the management module 115 from one or more memory modules 103 to the computing device. The management module 115 may respond by allocating the requested amount of memory, or a subset thereof, such as based on current utilization of memory by other computing devices 113 (e.g., 113B-N) coupled to the PCIe Switch 110. In some examples, the management module 115 may receive such a request via the API and generate an API response indicative of an amount of memory allocated, in some cases with information about an address range of memory allocation. In some examples, such a response may be generated as a reporting measure, as allocated memory may in some examples be identified as usable by an operating system of the computing device 113A automatically upon allocation. Another example API request may include a request to release memory, such as to release a portion of allocated memory no longer required by the computing device 113A for a process, a collection of processes, virtual machine instance, or other memory consuming operation, and an API response may indicate an amount of memory de-allocated to the computing device. In some examples, API response may indicate a total amount of available memory after an allocation or de-allocation and may further indicate a projected future amount of available memory (e.g., in less than a second, less than a minute, etc.).

The management module 115 may include a BMC 115 for monitoring and management of one or more sensors, operation of the management module, memory module, back-plane, etc., and health through a system management bus. In some example embodiments, the management module 115 may provide access to the system management bus via an out-of-band management network 125 interface to which the memory server and a plurality of computing devices 113 are coupled.

A memory module 103 may serve as a memory node providing an allocatable pool of memory for a memory server, which may include one or more such modules. For example, as shown, a memory server may include at least one such memory modules 103 and in some cases three or more such modules coupled to a PCIe Switch 110, depending on configuration (e.g., of a chassis of a memory server). As an example, a 2 U memory server may include up to three or four memory modules 103. In some examples, such as where a management module 115 is implemented on a back-plane of a chassis of the memory server, the memory server chassis may have four available receptacles for receiving a respective number of memory modules 103. In some examples, a management module 115 may be received in one such receptable, leaving three remaining receptacles to receive a respective number of memory modules 103.

Each memory module 103 may include a memory module processor 105 that facilitates accelerated access to all or some of a pool of memory to a computing device 113 (e.g., memory client). Multiple computing devices 113 may simultaneously access respective subsets of a pool of memory in some embodiments. A memory module processer 105 may receive and transmit data corresponding to a pool of memory of the memory module 103 to the PCIe Switch 110, which may route data to/from the memory module and computing devices 113 and the management module 115.

In some example embodiments, the memory module processor 105 may be a FPGA or ASIC configured to execute functionality of the memory module 103, such as allocation of a subset of memory and communication of data to/from the subset of memory to a computing device 113 to which the subset of memory is allocated. The memory module processor 105 may allocate and de-allocate a subset of memory responsive to instructions received from the management module 115. For example, the management module 115 may instruct the memory module 103A to allocate an amount of memory, like a specific address range (or ranges) of available memory of the memory module to a computing device 113A, and may later instruct the memory module to de-allocate all or some of that amount of memory. The memory module processor 105A may receive data from the computing device 113A corresponding to the allocated subset of memory via the PCIe Switch 110 and return data from the allocated subset of memory to that computing device via the PCIe Switch. Thus, for example, a FPGA or ASIC implementing the memory module processor 105 may act as a memory controller providing a PCIe endpoint which connects to the PCIe Switch 110. As a memory controller, the memory module processor 105 may implement a DIMM transceiver for communications between one or more DIMM Slots and a PCIe transceiver for communications between the memory module 103A and the PCIe Switch 110.

Some embodiments may implement memory controllers (e.g., by memory module processor 105, such as via an FPGA, ASIC, or other processor) with parallel memory interfaces to JEDEC-standard compliant dual inline memory modules (DIMMs), such as load reduced DIMMs (LRDIMMs), or differential DIMMs (DDIMMs), registered DIMMs (RDIMMs), or the like. In some cases, DIMMs may communicate with the memory controller via the Open Memory Interface (OMI) standard, the High Bandwidth Memory, standard, or any version of the DDR standards (e.g., DDR3, DDR4, or DDRY), the contents of each the most recently adopted versions of standards of which are hereby incorporated by reference. In some cases, the OMI standard may make relatively efficient use of limited connections (e.g., solder balls or pins) on FPGAs or many ASICs packages, allowing more memory to be attached in some cases. In some cases, the memory controller may be the SMC 1000 8×25 G Smart Memory Controllers from Microchip Technology Inc. of Chandler, Ariz., and in some cases, each memory controller may support, and embodiment may implement, 2, 4, 6, 8, or more memory channels to communicate with DIMMs. In some cases, the memory controller may be configured to communicate with CXL-based memory and may implement the corresponding standards to do so, again the most current versions of which are hereby incorporated by reference.

In some embodiments, the memory controllers may perform error detection and correction for each memory module and provide a health status accessible by the management module 115 over a PCIe interface. Additionally, temperatures, fan speed, and other aspects of memory module 103 state may be retrievable by the management module, such as via various system management buses (e.g., via BMC, SMBus, PMBus, etc.).

As shown by example memory module 103A, a memory module may comprise one or more slots to receive memory (e.g., random access or other memory) sticks, such as DIMM slots to receive respective DIMM memory sticks. Some examples may include 8, 16 or more such slots to receive a respective number of memory sticks. In some examples, the DIMM slots may be configured to receive differential DIMM memory sticks, and in some examples implement OpenCAPI standards (the following specifications for which including OpenCAPI 3.0 Transaction Layer Specification, OpenCAPI 3.1 Transaction Layer Specification, OpenCAPI 4.0 Transaction Layer Specification, OpenCAPI Data Link Layer Specification, OpenCAPI 32 Gbps PHY Signaling Specification and OpenCAPI 32 Gbps PHY Mechanical Specification being incorporated by reference herein in their entirety) for memory access and acceleration. The memory module processor 105A may allocate and facilitate access to memory of respective memory sticks in populated DIMM slots of one or more memory banks (e.g., Slots 1-8A and Slots 1-8B) for computing devices 113, such as based on instructions to allocate memory from one or more sticks inserted in the slots to a computing device.

Each memory module 103 may share a similar architecture, for example, memory module 103A may comprise a memory module processor 105A and a plurality of DIMM slots 1-8A, 1-8B and memory module 103B may comprise a memory module processor 105A and DIMM slot banks A and B, and so on for memory modules 103C and 103D. One or more memory modules 103 may be coupled to the PCIe Switch 110 via a back-plane of a chassis of the memory server. For example, one or more memory modules (and in some examples a management module 115) may be inserted into receptacles at a front of the memory server to mate with the black-plane.

Figure 2:
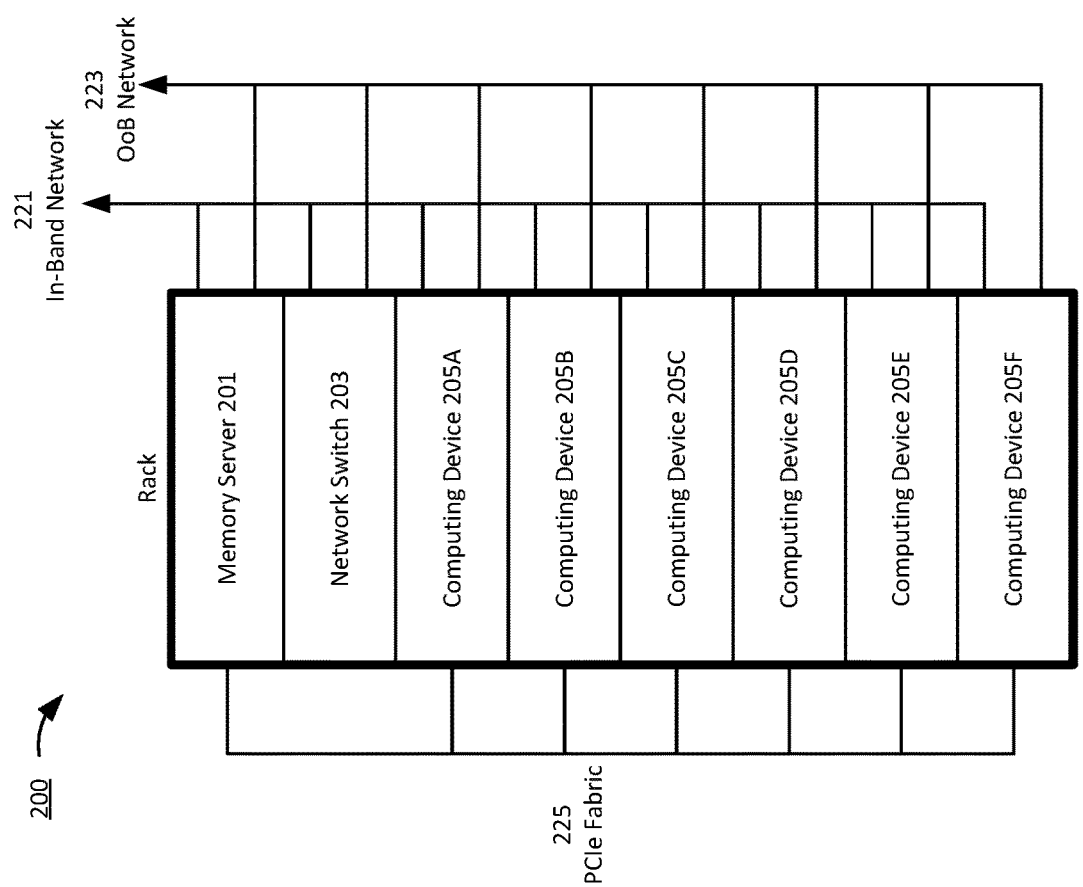
FIG. 2 illustrates an example rack-mount configuration implementing a disaggregated memory server in accordance with some example embodiments.

FIG. 2 illustrates an example rack-mount configuration 200 implementing a disaggregated memory server 201 in accordance with some example embodiments. Examples of a rack 200 may include EIA-310D compliant 19 inch racks which may receive computing devices up to approximately 17 and ¾ inches (~450 mm) in width or Open Compute Project standard compliant racks which may receive computing devices up to approximately 21 inches (~538 mm) in width.

In some embodiments, a memory server 201 may reside at the top of a rack 200 which may include other computing or networking devices, such as a network switch 203 and one or more computing devices 205A-F. In some cases, the memory server 201 may be in other positions, for instance in the middle of the rack, to reduce the furthest distance to any one computing device in the rack.

An example memory server 201 may be a 2 U tall device (e.g., approximately 3.5 inches for RU or approximately 3.8 inches for OpenU in height), and the network switch 203 and computing devices 205 may vary (e.g., in typical deployments) between 1 U and 4 U, through there is no requirement that the different devices must conform to example U heights. Length of the memory server may depend on deployment (e.g., EIA or OpenU rack) or other standard, some examples being between 24-36 inches (e.g., ~610-915 mm) in length. Computing devices 205A-F may be connected in accordance with a variety of topologies with various physical layer, data link layer, network layer, transport layer, and session layer communication formats being implemented. In the illustrated example, the computing devices 205, network switch 203, and memory server 201 may each be coupled to an in-band data network 221, like an ethernet or other network (e.g., InfiniBand, fiber channel, etc.) for data conveyance between the computing devices or to/from other rackers or the internet, and an out-of-band management network 223 by which the rack-mounted devices may be managed. The example configuration further illustrates, separate from the in-band 221 and out-of-band networks 223, which may be found in traditional employments, a PCIe Fabric network 225 distinct from those networks. The PCIe Fabric network 225, or PCIe rack bus, may couple the memory server 201 to one or more computing devices 205 that may be memory clients of the memory server. For example, a computing device 205A coupled to the memory server 201 via a PCIe bus may request an amount of memory to be allocated to processes of the computing device 205A and the allocated amount of memory may be accessible to the computing device 205A from the memory server 205 via the PCIe Fabric network 225. Data communications to/from the allocated memory resident to the memory server 201 and the computing device 205A may be conveyed via the PCIe Fabric network 225. For example, the PCIe Fabric network 225 may couple a PCIe bus of the computing device 205A (and other computing devices 205B-F) to a PCIe Switch of the memory server 201 which routes data between memory modules and computing devices. In some examples, each computing device 205 may be coupled to the memory server 201, such as in parallel, to provide a communication path between a PCIe Switch and the computing devices. In some examples, a computing device 205 may be directly coupled to the memory server 201 to provide a distinct communication path between the PCIe Switch and the computing device.

In some embodiments, computing devices 205 of the rack-mounted computing devices supported by the memory server 201 may communicate with memory in the memory server by implementing a CXL.memory interconnection standard (version 2.0 of the specification of which is hereby incorporated by reference) over a PCIe bus implemented by the PCIe Fabric network 225. For example, volatile (e.g., capacitor based) or non-volatile (e.g., phase change based, like Optane) memory connected by implementing a DDR5 standard, or various other types of system memory may be pooled by the rack-mounted computing devices using the memory server. In some cases, Gen-Z over PCIe may be used in place of CXL.memory. In some cases, the presently described FPGAs or ASICs may be configured to support both CXL.memory and Gen Z or in some cases, such as in the case of FPGAs, may be re-programmable to be configured to support one or the other, or in some cases, such as in the case of ASICs, may be set in a desired configuration (e.g., via dip switch or other means).

Figure 3:
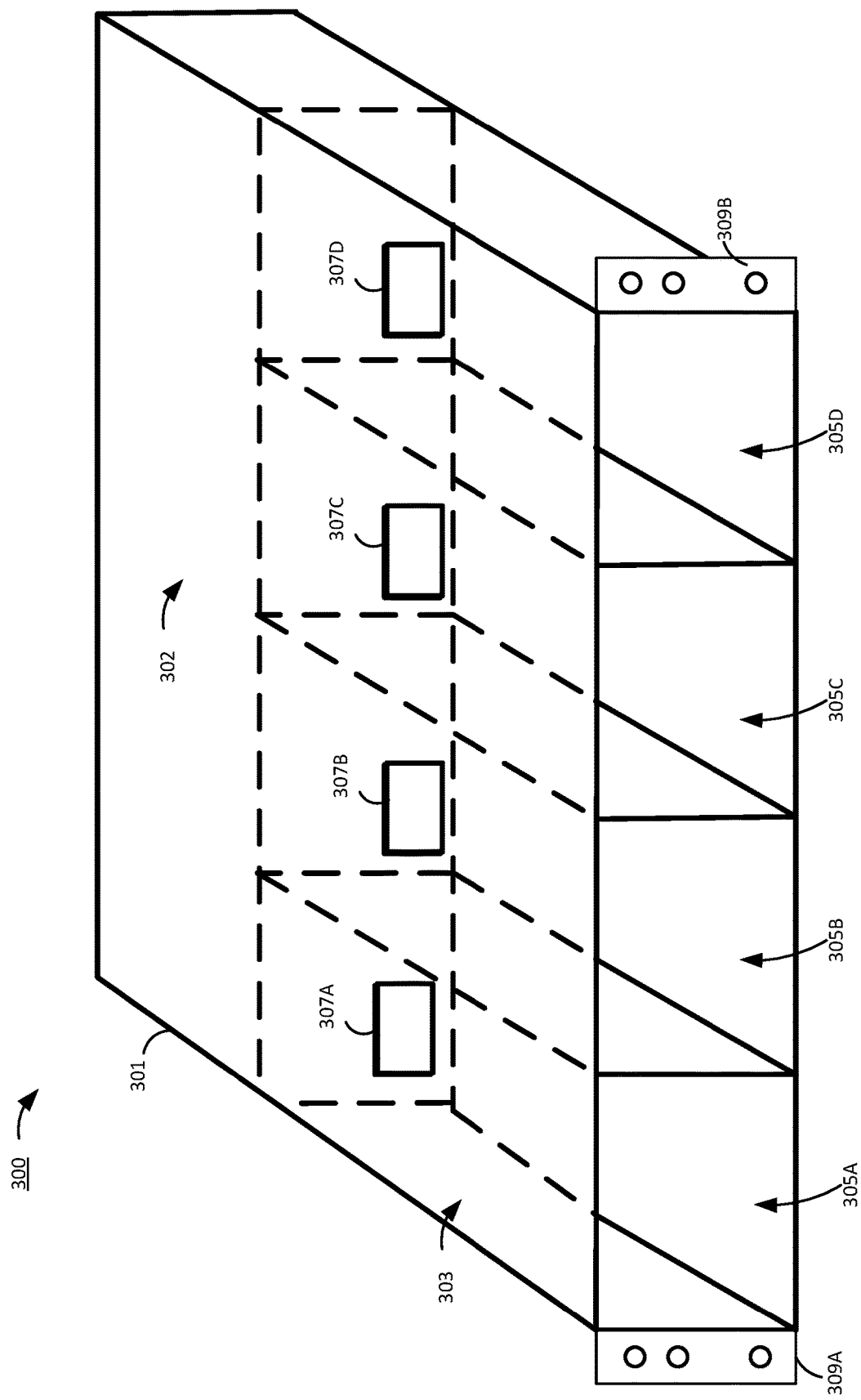
FIG. 3 illustrates an example chassis of a disaggregated memory server in accordance with some example embodiments.

FIG. 3 illustrates an example chassis 300 of a disaggregated memory server in accordance with some example embodiments. As shown, a chassis 300 of a memory server may comprise an outer chassis 301, which may be sized in accordance with given rack standard, such as to be 19 or 21 inches or less in width. Tabs or mounting plates 309A, 309B, or other means of securing the memory server within a rack may be resident or attached to the outer chassis 301. Thus, for example, the outer chassis 301 may be mounted (e.g., securely) within a rack by tabs or one or more fasteners disposed into the rack through the mounting plates.

The chassis 300 may include a rear portion 302 defining a volume within which a back-plane may be housed and a front portion 303 defining a plurality of volumes within which modules may be housed. For example, the rear portion 302 may define a volume within which a rear tray housing a back-plane PCB like that depicted in FIG. 4 may be received. The font portion 303 may define a plurality of volumes, like a plurality of receptacles 305A-D, each of which may receive a front tray, like a respective module chassis, like that depicted in FIG. 5. The rear tray may locate a black-plane PCB within the rear portion 302 to position blind-mate back-plane connections 307A-307D within each of the receptacles 305A-D.

In some examples, each receptacle 305 that extend across the front of the outer chassis 300 may receive one of four interchangeable module trays of equal width and approximately 2 U in height. Full height separators may be disposed between receptacles 305A and 305B, 305B and 305C, and 305C and 305D. The separators along with a side (in some cases), top, and bottom of the chassis that define each receptacle may isolate airflow to each individual module. Each of the four receptacles may facilitate hot swap insertion and removal of modules (e.g., respective trays comprising management or memory module components) secured by clips on the front of the trays. In some examples, a reset and power button may be provided on a front of the chassis 300, each of which may be recessed to prevent accidental activation.

In some examples, up to three of the receptacles 305A-305D may be populated with front trays housing memory modules and a fourth one of the receptacles may be populated with a management module. In some examples, up to four of the receptacles 305A-305D may be populated with front trays housing memory modules, such as where a management module is implemented within the rear portion 302, such as in connection with a back-plane PCB.

In some examples, the memory server chassis 300 may house in the rear portion 302 a back-plane PCB including a PCIe Switch, like a 40, 60, 80 or 100 or more lane PCIe Switch. The back-plane PCB and a rear plane (e.g., a rear face) of the chassis 300 may provide for connections between other computing devices and the memory server. For example, the back-plane PCB or one or more connection interfaces disposed at the rear plane and coupled the back-plane PCB may expose connectors by which computing devices may be coupled to the memory server, such as with cables (e.g., electrical, optical fiber, etc.). For example, a PCIe bus of a computing device may be coupled to the PCIe Switch via a connection interface provided at the rear of the chassis 300 and a cable connection to a connection interface provided at the computing device.

Modules inserted within the receptacles 305 may blind-mate with respective blind-mate connectors 307 disposed on the back-plane PCB. Receptacles 305 and module trays may have approximately equal dimensions, with the module trays being sized to be received by the receptacles. Module trays may support a PCB size of approximately 80-120 mm×380-440 mm with blind mate connectors for power and data at the rear that interface with back-plane PCB housed within the rear portion 302 of the memory server chassis, and the trays may be hot swappable between receptacles.

In some examples, a back-plane PCB housed within the rear portion 302 of the memory server chassis may be housed on a removable rear tray, which may be inserted into the rear portion. A set of rear accessible PCIe×16 slots (e.g., to convey data between memory system and other rack-mount devices within the rack) may be included on the back-plane PCB and accessible from a rear of the memory server chassis for coupling computing devices (e.g., memory clients) to the memory server).

In some examples, each module which may inserted into a receptacle 305 may comprise an LED controller which may be coupled to a BMC bus (e.g., system management bus) for visible indication of module status of a module from a front of the chassis. One or more series-wired LEDs, like RGB LEDs, may be coupled to the LED Controller to provide optical status indication of the module.

Figure 4:
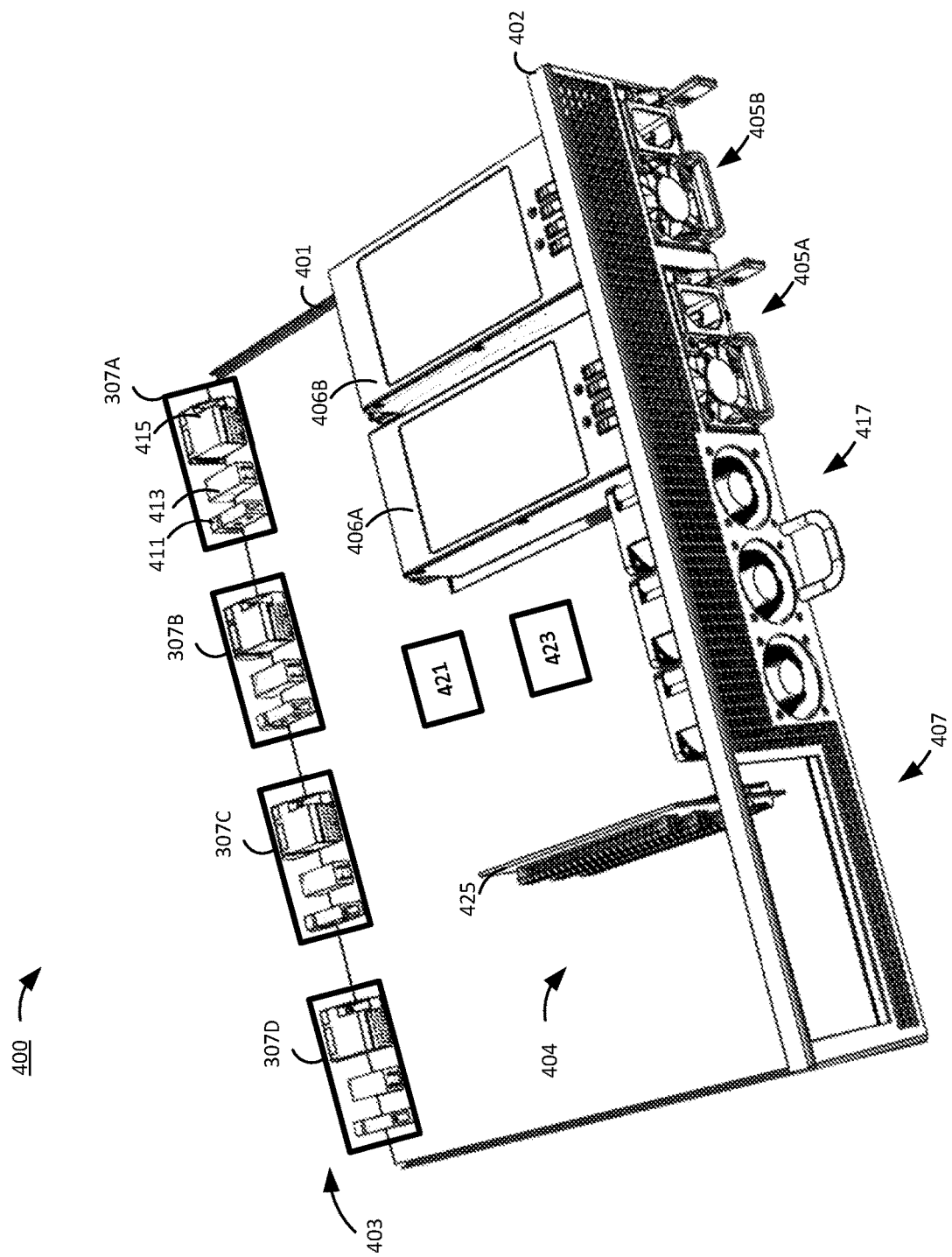
FIG. 4 illustrates an example rear tray of a disaggregated memory server in accordance with some example embodiments.

FIG. 4 illustrates an example rear tray 400 of a disaggregated memory server in accordance with some example embodiments. A rear panel 402 of the tray 400 may correspond to a rear face of a memory server chassis (e.g., as depicted in FIG. 3). The rear tray 400 may comprise a bottom 401 that receives a back-plane PCB 404.

The bottom 401 may comprise a plurality of holes to receive a set of fasteners by which the back-plane PCB 404 is mounted within the tray 400 in fixed relation to the rear 403 of the tray to position blind-mate back-plane connections 307A-307D of the PCB 404, such as in spaced relation within respective receptacles exposed at a front of a memory server chassis, and blind-mate connection (not shown) to one or more rear-inserted power supplies 406. An example back-plan connection 307A may include a locating pin or locating pin receiver 411 (e.g., to aid in facilitating blind-made connections, like a Samtec EGB(F or M)-RA-20), a blind-mate power interface 413 (e.g., male or female, with a received device including the opposite gender, like a Samtec EPTS-2-P-D-RA-04 or Samtec EPTT-2-P-11.5-D-RA), and a blind-mate data interface 415 (e.g., male or female, with a received device including the opposite gender, like a Samtec EBT(F or M)-4-10-2.0-S-RA-1-R).

The PCB 404 may include one or more sensors or devices 421, like a PCIe Switch, etc. and BMC 423 interface (which may support BMC control), like an I2C Switch or other interface/switch (e.g., SMBus, PMBus, etc.) for out-of-band device management (e.g., of memory modules or management module). For example, a memory server may provide monitoring of the status and conditions throughout the entire system via baseband management, like an overall system management bus utilizing I2C or SMBus (or PMBus) provided by the BMC 423 interface to which each memory module is coupled via their corresponding blind-mate connectors (e.g., data connector, or other connector) to the back-plane PCB 404. A management module may similarly couple to the BMC 423 via a blind-mate connector in some embodiments, or via other connection to the back-plane PCB (e.g., in examples where the management module is resident to the back-plane PCB or otherwise housed on a rear-tray rather than in one of a plurality of front trays). The management module may act as a primary on the management bus, with the memory modules being secondaries, with the management module being able to monitor memory module and back-plane PCB or other memory server system states (e.g., temperatures, fan speeds, etc.) and effectuate control over fan speed or other functions. In some examples, the BMC 423 interface may isolate each memory module on the management bus (e.g., from other memory modules), like by an I2C switch resident on the back-plane PCB 404.

In some examples, one or more of a back-plane PCB 404 implementing a PCIe switch, management module, and memory modules may include fan controllers with programmable lookup tables to specify fan speed at various sensed temperatures. Each fan controller may have at least one localized temperature sensor for determining its fan speed. The fan controllers may operate independently from software for determining the proper speed of operation after the initial configuration has been written to them. The fan controller may detect a failing fan and report an error state corresponding the failing fan via the BCM bus (e.g., system management bus). In some examples, a management module may update fan controller thermal profiles without interrupting the operating status of the memory server. Example fans depicted in the figures may operate on 12 VDC and be a 4-wire model which provides both PWM control and a tachometer output. Temperature sensor may be disposed in critical thermal locations on the back-plan PCB 404 and PCBs of memory modules (and management module). These sensors, in addition to other sensors connected to fan controllers, may be read by a management module from the system management bus, e.g., via a BMC 423 I2C switch interface. In some examples, power supply units 406 may report health and status and be monitored by a management module via a PMBus, which may be implemented by the BMC 423 interface. For example, the BMC 423 interface may be coupled to one or more power supply units of the memory server to obtain and report status of the power supply units to a management module.

The PCIe switch (e.g., like a device 421 resident on the back-plane PCB 404) may facilitate the conveyance of PCIe bus data to/from the blind-data connections 415 of respective memory modules and PCIe output interfaces 425 to which computing devices may be coupled. The back panel 402 may include an opening 407 by which a panel, one or more cards, or other interface extending PCIe bus 425 connectivity may be exposed at the rear of the memory server chassis. In some examples, a back-plane PCB 404 may comprise one or more PCIe bus connections 425 to which such a panel, cards, or other interface extending PCIe bus connectivity (e.g., to computing devices) may be removably connected.

The rear panel 402 may include one or more openings 405A, 405B configured to receive a respective power supply 406A, 406B. In some examples, a power supply 406 may be hot-swappable (e.g., without powering down the memory server) to mitigate single point failure. The openings 405A, 405B may be 1 U openings disposed in the rear panel 402 to positionally locate inserted power supplies 406A, 406B to with blind-mate PCB power connections on the back-plane PCB 404. Thus, for example, each power supply 406 may be individually capable to power the memory server and accommodate failover load from the other one of the power supplies until the malfunctioning power supply is replaced. The rear panel 402 may further include one or more cooling fans 417 to push or pull air through the memory server chassis.

Figure 5:
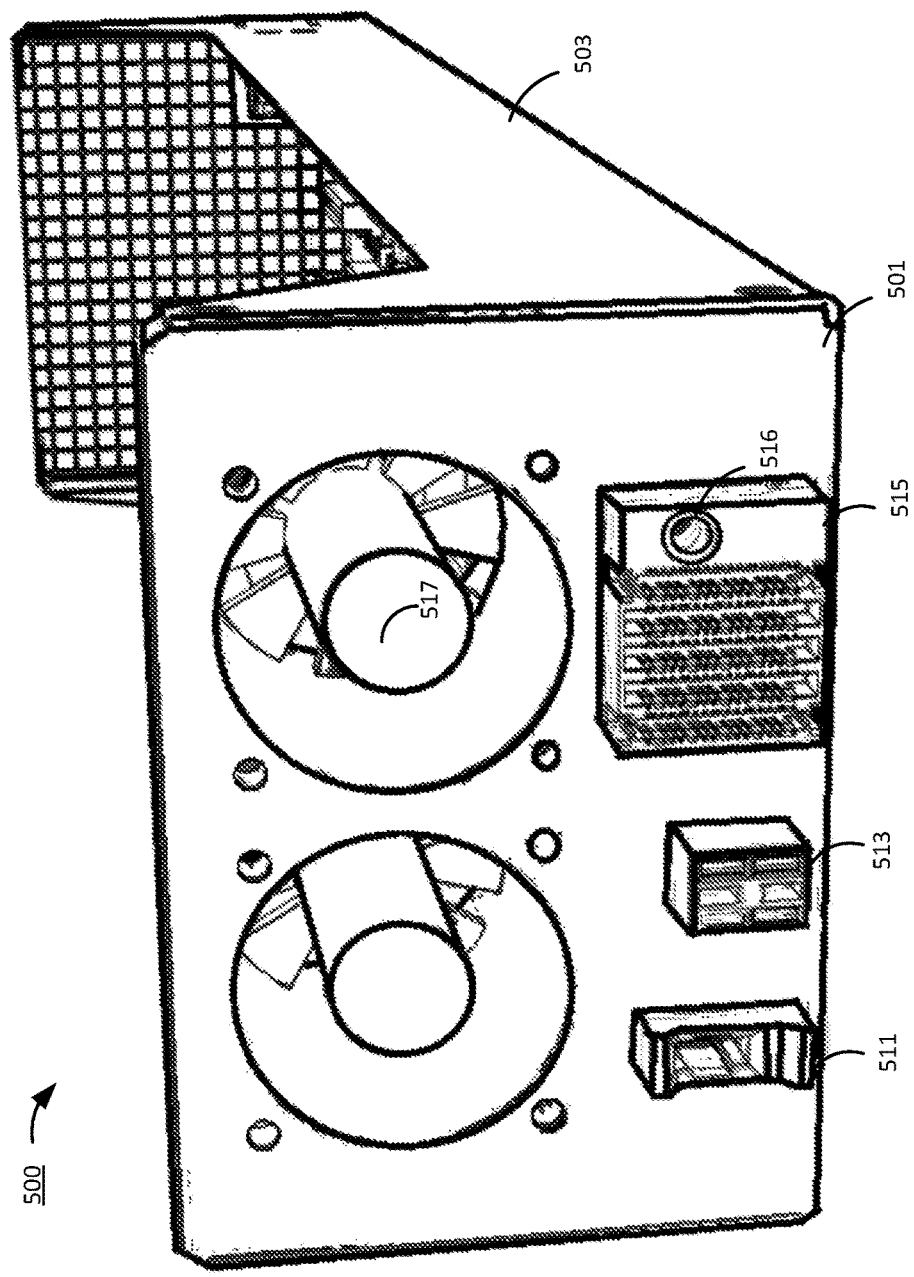
FIG. 5 illustrates an example front tray of a disaggregated memory server in accordance with some example embodiments.

FIG. 5 illustrates an example front tray 500 of a disaggregated memory server in accordance with some example embodiments. An example front tray 500 may include a chassis 503 configured to receive a memory or management module PCB and one or more fans 517. For example, a PCB may be received in a bottom (not shown) of the chassis 503 and one or more fans 518 may be coupled to a rear panel 501 of the chassis. The chassis 503 may be sized to be received by a receptacle of a memory server (e.g., in one of four receptacles). Thus, for example, the chassis 503 may have an approximate width of 4 and ⅜ inches (e.g., ~112 mm for a 19 inch wide memory server chassis) or 5 and ¼ inches (e.g., ~134 mm for a 21 inch wide memory server chassis). A length of the chassis may vary, e.g., based on memory chassis length, lengths and layout of memory sticks to be accommodated in a memory module, and other factors (e.g., power supply length, etc.). In some examples, a length of the chassis 503 may be approximately ⅜ to ⅝ the length of the memory server chassis, although no specific claim is made to memory server chassis or module chassis 503 length.

In some examples, a front tray 500 may support housing of a PCB size of at least 100 mm×400 mm with blind mate connectors for power and data at the rear panel 501 of the chassis 503. Alignment receptacles (e.g., 511, 516) may be implemented to ensure blind-mate power 513 and data 515 connector alignment to a back-plane PCB. Two fans 417 may be located at the rear of the tray 500, which may direct airflow from front to rear of the chassis 503. The front face of the module tray may include a plurality of vents to minimize airflow restriction.

As shown, a front tray 500 may include exposed at its rear panel 501 one or more connectors. Example connectors may include opposite gendered connectors of the aforementioned types discussed with reference to FIG. 4 and the back-plane PCB. For example, connector 511 may be a blind-mate locator pin connector, connector 513 may be a blind-mate power connector, and connector 515 may be a blind-mate data connector, each of which may be of an opposing gender to that employed (e.g., respectively for connectors 411, 413, and 415) on the back-plane PCB. In some example embodiments, a blind-mate data connector 515 may include a locator pin receptable 516 (or locator pin to be received in such a receptable for an opposite gender connector).

Figure 6B:
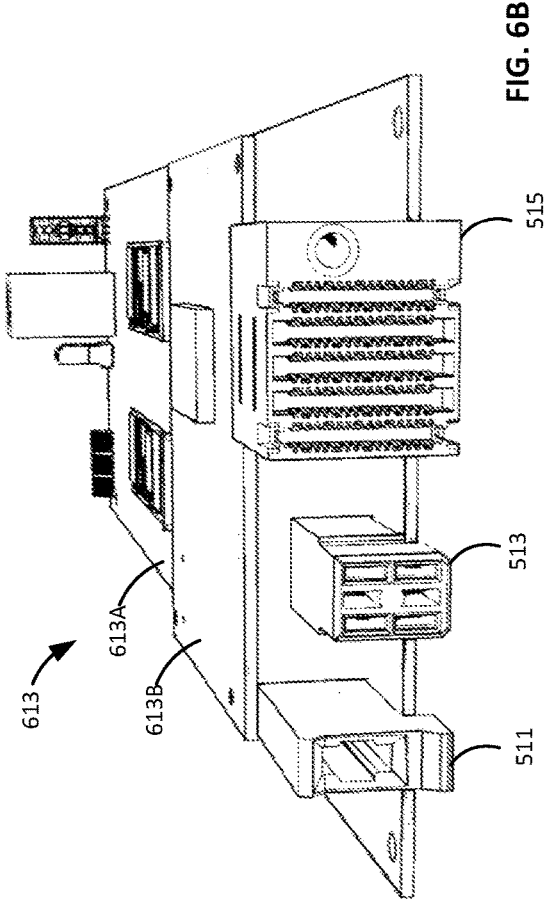
FIG. 6A, FIG. 6B, and FIG. 6C illustrate examples of a management module of a disaggregated memory server in accordance with some example embodiments.
Figure 6A:
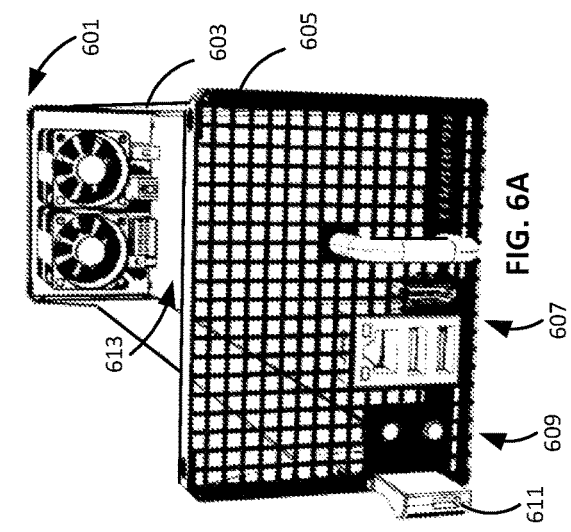
Figure 6C:
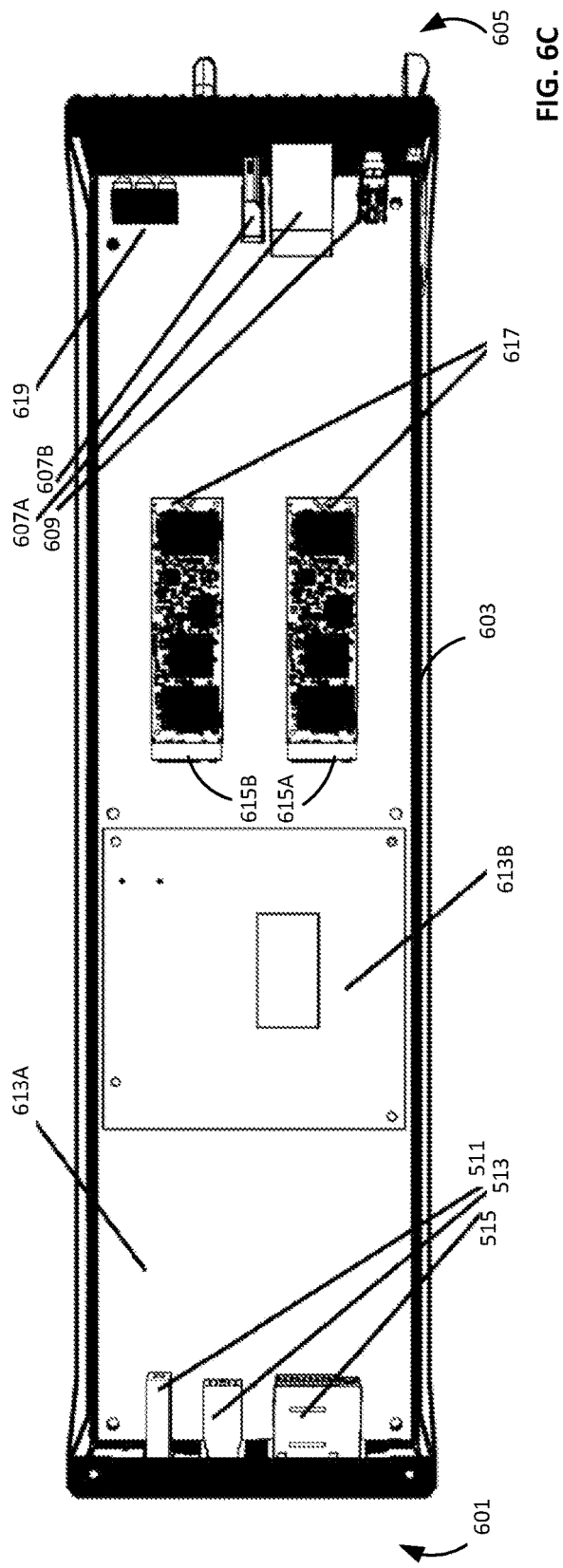

FIG. 6A, FIG. 6B, and FIG. 6C illustrate examples of a management module of a disaggregated memory server in accordance with some example embodiments. As shown in FIG. 6A, a management module chassis 603 may be configured consistent with the dimensions of a front tray and have a rear panel 601 configured similarly to that depicted and discussed with reference to FIG. 5.

In some embodiments, the rear panel 601 may expose example connectors 511, 513, 515 shown in FIG. 5. The example connectors 511, 513, 515 may be disposed on a management module PCB 613 housed within the management module chassis 603. A front panel 605 of the management module chassis 603 may include a mounting tab 611 by which the management module chassis is retained within a front receptacle of a memory server chassis. For example, the mounting tab 611 may retain the chassis 603 in fixed relation of depth to a back-plane PCB to maintain contact between the blind-mate connectors 511, 513, 515 of the management module PCB 613 housed within the chassis 603 and corresponding blind-mate connectors 411, 413, 415 of a back-plane PCB that are maintained in fixed relation at the rear of the front receptacle (e.g., by the rear tray housing the back-plane PCB when mounted within the memory server chassis). The front panel 605 may include power and reset buttons 609, and one or more front-side connections 607, like one or more network (e.g., in-band or out-of-band, USB, display, or other interface connections, some of examples of which may include but are not limited to ethernet, serial bus ports (e.g., USB 2.0, 3.0, etc. USB-C, etc.), display ports (e.g., display port, HDMI, USB-C, etc.), or other ports. In some examples, an out-of-band network interface (e.g., vPro AMT or IPMI) may share an ethernet port with an operating system of the management module. In some examples, the operating system may be executed by a computer-on-module (COM) that includes a processor of the management module.

FIG. 6B illustrates one example view of a management module PCB 613 which may be mounted within the example management module chassis 603. In some example embodiments, the management module PCB may include a bottom PCB 613A which is affixed within the chassis 603 and to which rear blind-mate connector components 511, 513, 515 and front-side accessible interface components 607, 609 are mounted. The bottom PCB 613A may receive a COM PCB 613B on which a processor, among other circuitry (e.g., one or more components illustrated with respect to the management module in FIG. 1), may be implemented. Some components may be implemented on the bottom PCB 613A instead of, or in addition to, the COM PCB 613. For example, the bottom PCB 613A may provide connectors (e.g., 615A, 615B) for one or more storage devices (e.g., 617) shown in FIG. 6C.

In some examples, bottom PCB 613A serves as a carrier for receiving the COM PCB 613B. The bottom PCB 613A and optionally the COM PCB 613B may be secured to the bottom of the chassis 603. In some examples, a bottom PCB 613A may have dimensions of approximately 100 mm×410 mm and may include one or more holes by which the PCB may be secured to the chassis by one or more fasteners. Some example PCBs may have 5-10 holes by which 5-10 fasteners may secure the PCB to the chassis 603. In some example embodiments, two or more of the holes are disposed along the rear edge of the PCB to increase the rigidity of the back-plane connector area. The COM PCB 613B may be secured to the bottom PCB 613A by connectors or fasteners. Examples of COM PCBs may include COM Express Type 6 Basic and Type 6 Compact form factors. The bottom PCB 613A provides power and data connectivity to the COM PCB 613B components via the rear-plane 601 blind-mate connectors 511, 513, 515 (which in some examples may share the same connector pinout as a memory module, such as to facilitate agnostic positioning of memory and management modules within receptacles of a memory server chassis). A hot swap circuit (not shown) may be disposed at the rear of the PCB near the blind-made back-plane connectors 511, 513, 515. Example storage units interfaces 615A, 615B may be configured to each receive a M.2 2280 SSD or other type of storage devices, such via a SATA interface. A power button, reset button and external connections for USB, video and networking interface components disposed on the bottom PCB 613A may be exposed through a front plane of the management module. Some embodiments may implement functionality of the bottom PCB 613A and COM PCB 613B on a single PCB.

In some example embodiments, a hot swap controller circuit (an example of which may be an Analog Devices ADM1276, the data sheet thereof being incorporated by reference herein in its entirety) may be implemented on the bottom PCB 613A or COM PCB 613B to provide safe live insertion and removal of a module (e.g., memory or management module) housed in the chassis 603 from a receptacle of a memory server. Example hot swap controllers may provide overcurrent and undervoltage/overvoltage protection for the one or both of the PCBs. Remote management of a host swap controller may be implemented by a PMBus protocol (SMBus/I²C) using a BMC. Management capabilities of the management module may include, but are not limited to MOSFET on/off, voltage measurement, current measurement and operating status. During insertion, the primary blind-mate power contacts (e.g., of connector 513) may be engaged before the hot swap controller is enabled. This may be accomplished by either a power on delay or a separate set of contacts that physically engage after the primary power contacts during insertion. In some examples, a COM Express module may treat a hot swap controller enable pin similar to a power on signal pin.

The management module may be a primary device on a system management bus of the memory server. Each other device, like one or more memory modules, power supplies, etc. housed inside a memory server chassis may be secondary devices and be accessible via the management module. In some examples, if a BMC (or SBC) does not provide a native SMBus primary device interface, the bottom PCB 613A may provide connectivity by a device connected to USB which is supported natively in an operating system (e.g., like a Linux OS executed by the management module). In some examples, the management module supports hot swap insertion and removal on a system management bus without corruption of clock or data lines. A hot swappable SMBus buffer (an example of which may be an NXP PCA9511A, the data sheet thereof being incorporated by reference herein in its entirety) may be implemented to address corruption of clock or data lines and, additionally, prevent loading down of an SMBus by an unpowered module. In some examples, during shutdown of a COM Express module, an enable pin on the SMBus buffer shall be pulled low to isolate the local SMBus interface from the main chassis SMBus (e.g., management communications flowing through a BMC or I2C switch of the back-plane PCB) and pulled high during active operation. During insertion of the management module, the enable line may be held low until the tray is seated completely and the hot swap controller has enabled the primary voltage power source. The management module, as described previously, may communicate with memory modules via a PCIe connection (e.g., facilitated by connector 515) to the back-plane PCB comprising a PCIe Switch. PCIe signaling may pass through the high-speed data connector 515 and the switch of the back-plane PCB may support hot swap operation of modules without corruption of PCIe signals.

FIG. 6C depicts a management module mounted within chassis 603. As shown, an example layout of components at the front plane 605 and rear plane 601 of the chassis consistent with FIGS. 6A and 6B is depicted. FIG. 6C further shows a set of LEDs 619, like RGB LEDs, disposed behind the font plane 605 of the management module chassis 603. The LEDs 619 may function as status indicators. For example, one or more status LEDs 619 which may indicate management module state (e.g., activity by flashing, error by color, etc.). In some embodiments, and light generated by the LEDs 619 may be visible through a grill of the front plane 605. One or more of the LEDs 619 depicted may be coupled to an LED Controller to provide optical status indication of the module. Also shown in FIG. 6C are example font-side accessible interface components 609, like power and reset buttons, components 607A comprising example dual USB ports and an ethernet port and components 607B comprising an example HDMI display port.

FIG. 7A, FIG. 7B, and FIG. 7C illustrate examples of a memory module of a disaggregated memory server in accordance with some example embodiments. As shown in FIG. 7A, a memory module chassis 703 may be configured consistent with the dimensions of a front tray and have a rear panel 701 configured similarly to that depicted and discussed with reference to FIG. 5.

In some embodiments, the rear panel 701 may expose example connectors 511, 513, 515 shown in FIG. 5. For example, the rear panel 701 may expose example connectors 511, 513, 515 disposed on a memory module PCB 713 housed within the memory module chassis 703. A front panel 705 of the memory module chassis 703 may include a mounting tab 711 by which the memory module chassis is retained within a front receptacle of a memory server chassis. For example, the mounting tab 711 may retain the chassis 703 in fixed relation of depth to a back-plane PCB to maintain contact between the blind-mate connectors 511, 513, 515 of the memory module PCB 713 housed within the chassis 703 and corresponding blind-mate connectors 411, 413, 415 of a back-plane PCB that are maintained in fixed relation at the rear of the front receptacle (e.g., by the rear tray housing the back-plane PCB when mounted within the memory server chassis). The front panel 705 may include front-side accessible power and reset buttons 709.

FIG. 7B illustrates one example view of a memory module PCB 713 which may be mounted within the example memory module chassis 703. In some example embodiments, the memory module PCB may include a PCB 713 which is affixed within the chassis 703 and to which rear blind-mate connector components 511, 513, 515 and front-side accessible interface components 709 are mounted. The PCB 713 may include a memory module processor, like a memory controller, which may be implemented by an ASIC or FPGA in some example embodiments, among other circuitry (e.g., one or more components illustrated with respect to the memory module in FIG. 1) which may be implemented on the PCB (e.g., like a Fan controller, or other components described herein). The memory module PCB 713 may include a plurality of DIMM slots 717 for receiving DIMM memory sticks 715. The DIMM slots and memory sticks may be organized in dual banks, like a memory stick bank 715A and memory stick bank 715B, disposed within respective banks of slots 717. The banks of slots 717 may be disposed on the front and rear sides of a memory module processor 718 disposed relatively centrally on the memory module PCB 713.

In some examples, memory module PCB 713 serves as a carrier for receiving a plurality of DIMM memory modules 715, like differential DIMM modules, which may be random-access memory modules typically coupled to motherboards of computing devices. Memory sticks 715 may be inserted into respective slots 717 and when the chassis 713 is inserted within a receptacle of a memory server chassis a top plane of the memory server chassis may retain the memory modules. For example, memory sticks 715 when inserted into the respective slots 717 may have a clearance of less 10 mm or 5 mm or less from a top plane of the memory server chassis to maintain contact between contacts of a memory stick 715 and a slot 717. An example DIMM slot 717 for receiving a memory stick consistent with the present techniques may be an Okins OK1USSD-060-T44 (the datasheet therefore being incorporated by reference herein in its entirety) or equivalent. Each memory slot may be secured to the memory module PCB 713 by four M2.5×8 mm socket head screws. A bottom side of the memory module PCB 713 may comprise broaching nuts or surface mount nuts for securing the screws. Examples of acceptable hardware are PEM SMTSO-M25-2-ET and KF2-M2.5-ET.

In some examples, a memory module PCB 713 may have dimensions of approximately 100 mm×410 mm and may include one or more holes by which the PCB may be secured to the chassis by one or more fasteners. Some example PCBs may have 5-10 holes by which 5-10 fasteners may secure the PCB to the chassis 703. In some example embodiments, two or more of the holes are disposed along the rear edge of the PCB to increase the rigidity of the backplane connector area. In some examples, DIMM slots 717 are disposed lengthwise in relation to the length of the chassis 703 to facilitate front to back airflow through the memory sticks. In some embodiments, the DIMM slots 717 are disposed on the memory modules PCB 713 in a staggered fashion for adjacent DIMM slots such that overlap of adjacent memory sticks when disposed in the slots 715 is minimized, within the constraints of the form factor of the chassis 703 and memory module processor 718. An example of such a configuration is illustrated in FIGS. 7B and 7C. In some examples, heat syncs of memory sticks may be staggered to reduce overlap of hot spots. Example embodiments may afford and implement a high density of memory sticks, such as 8 sticks per bank (16 sticks total) with ~12 mm center to center spacing in a bank without collisions or interference. Some example embodiments of memory module PCB 713 layouts may comprise thick components disposed on a top side of the PCB, such as to provide sufficient height clearance to a top plane of a memory server chassis for mounting of memory sticks 715 vertically within slots 717. An example memory module PCB may be relatively thick, comprising 10 or more layers, like 12 layers, approximately 8 of which may be dedicated to power. A relatively large number of layers (e.g., 10 of more) may be implemented as a tradeoff to due to space constraints within a 2 U chassis (e.g., 3.5 inch tall, or 3.8 tall) that prevents disposing of taller components on the bottom of the memory module PCB 713. Specifically, while the memory module PCB 713 may be relatively thick and include a relatively large number of layers as a result of constraining disposing of certain taller components (e.g., power capacitors, etc.) on a top of the PCB, the resulting mounting clearance for memory sticks 717 within DIMM slots 717 may be increased relative to alternative PCB layouts.

The memory module processor 718 may be relatively centrally disposed on the memory module PCB 713 to ease routing to the DIMM slots. A hot swap circuit (not shown) may be disposed at the rear of the PCB near the blind-made back-plane connectors 511, 513, 515. Regulators for locally produced voltages may be disposed proximate to the memory module processor 718 to minimize the lengths of high current traces within the PCB 713 to the processor. The memory module PCB 713 provides power and data connectivity to the various components disposed on or coupled to the PCB via the rear-plane 701 blind-mate connectors 511, 513, 515 (which in some examples may share the same connector pinout as a management module, such as to facilitate agnostic positioning of memory and management modules within receptacles of a memory server chassis).

In some example embodiments, a hot swap controller circuit (an example of which may be an Analog Devices hot swap controller ADM1276, the data sheet thereof being incorporated by reference herein in its entirety) may be implemented on the memory module PCB 713 to provide safe live insertion and removal of a module (e.g., memory or management module) housed in the chassis 703 from a receptacle of a memory server. Example hot swap controllers may provide overcurrent and undervoltage/overvoltage protection the memory module PCB. Remote management of a host swap controller may be implemented by a PMBus protocol (SMBus/I²C) using a BMC. Management of the memory module (e.g., by a management module) may include, but is not limited to MOSFET on/off, voltage measurement, current measurement and operating status. During insertion, the primary blind-mate power contacts (e.g., of connector 513) may be engaged before the hot swap controller is enabled. This may be accomplished by either a power on delay or a separate set of contacts that physically engage after the primary power contacts during insertion.

The memory module may be a secondary device on a system management bus of the memory server and be accessible via the management module. A hot swappable SMBus buffer (an example of which may be an NXP PCA9511A, the data sheet thereof being incorporated by reference herein in its entirety) may be implemented to address corruption of clock or data lines and, additionally, prevent loading down of an SMBus by an unpowered module. In some examples, during shutdown of a memory module, an enable pin on the SMBus buffer shall be pulled low to isolate the local SMBus interface from the main chassis SMBus (e.g., management communications flowing through a BMC or I2C switch of the back-plane PCB) and pulled high during active operation. During insertion of the memory module, the enable line may be held low until the tray is seated completely and the hot swap controller has enabled the primary voltage power source. The memory module, as described previously, may communicate with computing devices (or management module) via a PCIe connection (e.g., facilitated by connector 515) to the back-plane PCB comprising a PCIe Switch. PCIe signaling may pass through the high-speed data connector 515 and the switch of the back-plane PCB may support hot swap operation of modules without corruption of PCIe signals.

FIG. 7C depicts a memory module mounted within chassis 703. As shown, an example layout of components at the front plane 705 and rear plane 701 of the chassis consistent with FIGS. 7A and 7B is depicted. FIG. 7C further shows a set of LEDs 719, like RGB LEDs, disposed behind the font plane 705 of the management module chassis 703. The LEDs 719 may function as status indicators. For example, one or more status LEDs 719 which may indicate management module state (e.g., activity by flashing, error by color, etc.). In some embodiments, and light generated by the LEDs 719 may be visible through a grill of the front plane 705. One or more of the LEDs 719 depicted may be coupled to an LED Controller to provide optical status indication of the module. Also shown in FIG. 7C are example font-side accessible interface components 709, like power and reset buttons.

In some example embodiments, such as those depicted in FIGS. 7B and 7C, each memory module may include 16 DIMM slots, like 16 differential DIMM slots 717. Each slot may receive, for example, a memory stick comprising up to 256 GB, 512 GB more memory capacity. Thus, for example, the memory module processor 718 may manage approximately 4 TB or more of memory capacity allocatable to computing devices, and a memory server chassis receiving three or more such modules may afford 12 TB or more of allocatable memory capacity.

Figure 8:
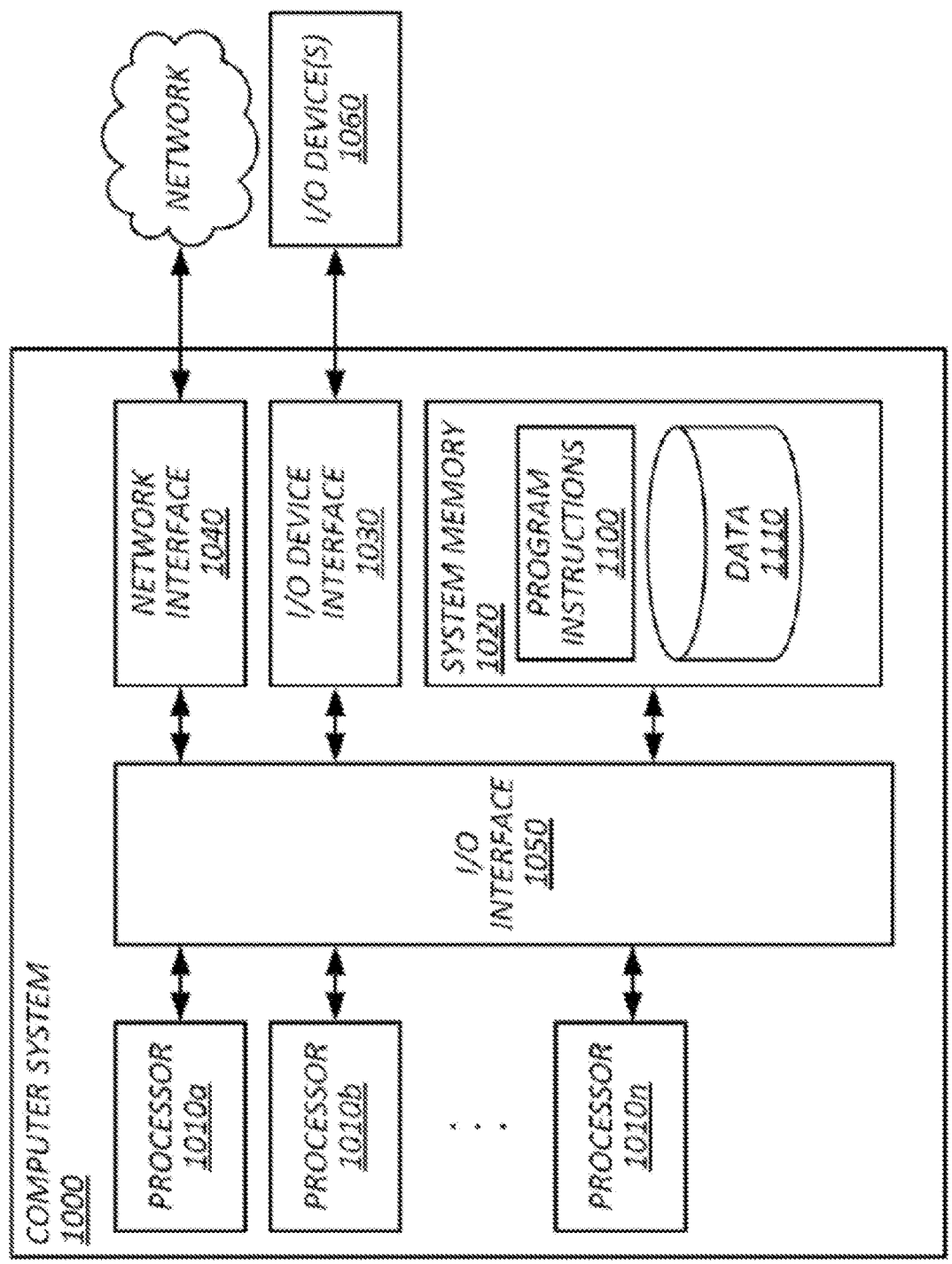
FIG. 8 illustrates an example computing device by which the present techniques may be implemented in some embodiments.

FIG. 8 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A server-device, comprising:
a chassis configured to be mounted in a server rack, the chassis having three or more receptables accessible via a front of the chassis;
a circuit board configured to convey Peripheral Component Interconnect Express (PCIe) bus data between first connection interfaces and second connection interfaces coupled to the circuit board, the circuit board being mounted to the chassis and having three or more of the first connection interfaces disposed in spaced relation to each other on the circuit board, each of the three or more first connection interfaces being positioned at a rear of a respective one of the three or more receptacles to blind-mate with a corresponding connection interface disposed at a rear of a front tray for housing memory;
a plurality of memory controllers coupled to the circuit board via the first connection interfaces, the first connection interfaces configured to convey PCIe bus data between respective memory controllers and the circuit board, the second connection interfaces configured to convey PCIe bus data between the circuit board and respective PCIe buses of other computing devices;
a plurality of banks of dual in-line memory module (DIMM) slots configured to place a memory received in a slot in communication with one of the memory controllers; and
one or more processors and system memory coupled to the plurality of memory controllers via the circuit board.

2. The device of claim 1, wherein:
the chassis is configured to receive a plurality of memory nodes comprising a respective memory controller and a respective one or more banks of DIMM slots.

3. The device of claim 2, wherein:
the chassis is configured to receive a management node comprising the one or more processors and the system memory.

4. The device of claim 1, wherein:
the chassis is a 2 U rack-mount chassis.

5. The device claim 1, comprising:
means to receive 48 or more DIMMs.

6. The device of claim 1, wherein:
the PCIe bus is a Peripheral Component Interconnect Express 4, 5, or 6 data bus; and
the circuit board comprises a PCIe switch, the PCIe switch configured to convey PCIe bus data between the first connection interface and the second connection interfaces.

7. The device of claim 1, wherein:
the one or more processors and the system memory are attached to the circuit board; and
the chassis is a 2 U rack-mount chassis.

8. The device of claim 1, comprising:
means to receive 64 or more DIMMs.

9. The device of claim 1, wherein:
the three or more receptacles comprises four receptables,
the three or more first connection interfaces comprises four first connection interfaces, and
the four receptacles each have approximately equal dimensions.

10. The device of claim 9, wherein:
the four first connection interfaces are disposed in spaced relation to each other on the circuit board, and
each one of the four first connection interfaces is disposed at a rear of a respective one of the four receptacles to blind-mate with a corresponding connection interface disposed at a rear of a front tray housing a memory node or a memory management node.

11. The device of claim 9, wherein:
each of the four receptacles is configured to receive:
a front tray housing a memory node comprising a memory controller of the plurality of memory controllers and a plurality of DIMMs, or
a memory management node comprising the one or more processors and the system memory; and
a first front tray housing a memory node and a second front tray housing a memory management node each comprise a rear connection interface configured to mate with any one of the first connection interfaces.

12. The device of claim 1, comprising:
means to place 12 terabytes or more of random-access memory in communication with a PCIe bus of a computing device.

13. The device of claim 1, wherein the system memory stores computer program instructions configured to cause the one or more processors to effectuate operations comprising:
allocating a first subset of memory coupled to DIMM slots managed by a first memory controller to a first computing device, wherein the first computing device is coupled to a first one of the second interfaces by a first cable among a plurality of cables coupled to respective computing devices, and wherein the first memory controller places in communication, in response to the allocating of the first subset of memory, the first computing device with the first subset of memory; and
allocating a second subset of memory coupled to DIMM slots managed by the first memory controller or a second memory controller to the second computing device, wherein the second computing device is coupled to a second one of the second interfaces by a second cable among the plurality of cables coupled to respective computing devices, and wherein the first memory controller or the second memory controller places in communication, in response to the allocating of the second subset of memory, the second computing device with the second subset of memory.

14. A tangible non-transitory computer-readable medium storing computer program instructions that when executed by one or more processors effectuate operations comprising:
receiving, by one or more processors of a memory server, a first request from a first computing device for an amount of memory to be made available to the first computing device on a Peripheral Component Interconnect Express (PCIe) bus of the first computing device;
allocating, by one or more processors of the memory server, a first subset of memory coupled to dual in-line memory module (DIMM) slots managed by a memory controller to the first computing device, wherein the first computing device is coupled to the memory controller by a first cable among a plurality of cables coupled to respective computing devices, and wherein the memory controller places in communication, in response to the allocating of the first subset of memory, the first computing device with the first subset of memory;
receiving, by one or more processors of the memory server, a second request from a second computing device for an amount of memory to be made available to the second computing device on a PCIe bus of the second computing device; and
allocating, by one or more processors of the memory server, a second subset of memory coupled to DIMM slots managed by the memory controller to the second computing device, wherein the second computing device is coupled to the memory controller by a second cable among the plurality of cables coupled to respective computing devices, and wherein the memory controller places in communication, in response to the allocating of the second subset of memory, the second computing device with the second subset of memory.

15. The medium of claim 14, wherein:
placing the first computing device in communication with the first subset of memory comprises making the first subset of memory system memory of the first computing device and placing the second computing device in communication with the second subset of memory comprises making the second subset of memory system memory of the second computing device;
the memory controller is coupled, via a circuit board, to the first cable and the second cable;
the PCIe bus is a Peripheral Component Interconnect Express 4, 5, or 6 data bus;
the memory server comprises a plurality of memory controllers; and
each memory controller is coupled to at least one respective bank of DIMM slots.

16. The medium of claim 15, further comprising instructions to effectuate operations comprising:
allocating, by one or more processors of the memory server, a third subset of memory in response to the second request, the third subset of memory coupled to DIMM slots management by a second memory controller in the plurality of memory controllers, the second computing device coupled to the second memory controller by the second cable, the second memory controller placing in communication, in response to the allocating, the second computing devices with the third subset of memory.

17. The medium of claim 14, wherein the memory server comprises:
   a circuit board configured to convey PCIe bus data between first connection interfaces and second connection interfaces coupled to the circuit board; and
   a plurality of memory controllers coupled to the circuit board via the first connection interfaces, the first connection interfaces configured to convey PCIe bus data between respective memory controllers and the circuit board, the second connection interfaces configured to convey PCIe bus data between the circuit board and respective PCIe buses of the computing devices.

18. The medium of claim 14, further comprising instructions to effectuate operations comprising:
   receiving, by one or more processors of the memory server, a third request from the first computing device for releasing an amount of memory made available to the first computing device; and
   de-allocating, by one or more processors of the memory server, all or some of the first subset of memory coupled to DIMM slots managed by the memory controller from the first computing device.

19. The medium of claim 18, further comprising instructions to effectuate operations comprising:
   receiving, by one or more processors of the memory server, a fourth request from a third computing device for an amount of memory to be made available to the third computing device on a PCIe bus of the third computing device; and
   allocating, by one or more processors of the memory server, a third subset of memory coupled to DIMM slots managed by the memory controller to the third computing device, the third computing device coupled to the memory controller by a third cable among the plurality of cables coupled to respective computing devices, the memory controller placing in communication, in response to the allocating, the third computing device with the third subset of memory.

20. The medium of claim 19, wherein:
   the fourth request is received after the third request; and
   at least some of the memory in the third subset of memory allocated to the third computing device responsive to the fourth request was de-allocated from the first computing device responsive to the third request.

21. A computer-implemented method comprising:
   receiving, by one or more processors of a memory server, a first request from a first computing device for an amount of memory to be made available to the first computing device on a Peripheral Component Interconnect Express (PCIe) bus of the first computing device;
   allocating, by one or more processors of the memory server, a first subset of memory coupled to dual in-line memory module (DIMM) slots managed by a memory controller to the first computing device, wherein the first computing device is coupled to the memory controller by a first cable among a plurality of cables coupled to respective computing devices, and wherein the memory controller places in communication, in response to the allocating of the first subset of memory, the first computing device with the first subset of memory;
   receiving, by one or more processors of the memory server, a second request from a second computing device for an amount of memory to be made available to the second computing device on a PCIe bus of the second computing device; and
   allocating, by one or more processors of the memory server, a second subset of memory coupled to DIMM slots managed by the memory controller to the second computing device, wherein the second computing device is coupled to the memory controller by a second cable among the plurality of cables coupled to respective computing devices, and wherein the memory controller places in communication, in response to the allocating of the second subset of memory, the second computing device with the second subset of memory.

22. The computer-implemented method of claim 21, wherein:
   placing the first computing device in communication with the first subset of memory comprises making the first subset of memory system memory of the first computing device and the memory controller placing the second computing device in communication with the second subset of memory comprises making the second subset of memory system memory of the second computing device;
   the memory controller is coupled, via a circuit board, to the first cable and the second cable;
   the PCIe bus is a Peripheral Component Interconnect Express 4, 5, or 6 data bus;
   the memory server comprises a plurality of memory controllers; and
   each memory controller is coupled to at least one respective bank of DIMM slots.

23. The computer-implemented method of claim 22, further comprising:
   allocating, by one or more processors of the memory server, a third subset of memory in response to the second request, the third subset of memory coupled to DIMM slots management by a second memory controller in the plurality of memory controllers, the second computing device coupled to the second memory controller by the second cable, the second memory controller placing in communication, in response to the allocating, the second computing devices with the third subset of memory.

24. The computer-implemented method of claim 21, wherein the memory server comprises:
   a circuit board configured to convey PCIe bus data between first connection interfaces and second connection interfaces coupled to the circuit board; and
   a plurality of memory controllers coupled to the circuit board via the first connection interfaces, the first connection interfaces configured to convey PCIe bus data between respective memory controllers and the circuit board, the second connection interfaces configured to convey PCIe bus data between the circuit board and respective PCIe buses of the computing devices.

25. The computer-implemented method of claim 21, further comprising:
   receiving, by one or more processors of the memory server, a third request from the first computing device for releasing an amount of memory made available to the first computing device; and
   de-allocating, by one or more processors of the memory server, all or some of the first subset of memory coupled to DIMM slots managed by the memory controller from the first computing device.

26. The computer-implemented method of claim 25, further comprising:
receiving, by one or more processors of the memory server, a fourth request from a third computing device for an amount of memory to be made available to the third computing device on a PCIe bus of the third computing device; and
allocating, by one or more processors of the memory server, a third subset of memory coupled to DIMM slots managed by the memory controller to the third computing device, the third computing device coupled to the memory controller by a third cable among the plurality of cables coupled to respective computing devices, the memory controller placing in communication, in response to the allocating, the third computing device with the third subset of memory.

27. The computer-implemented method of claim 26, wherein:
the fourth request is received after the third request; and
at least some of the memory in the third subset of memory allocated to the third computing device responsive to the fourth request was de-allocated from the first computing device responsive to the third request.

28. A server-device, comprising:
a chassis configured to be mounted in a server rack;
a circuit board configured to convey Peripheral Component Interconnect Express (PCIe) bus data between first connection interfaces and second connection interfaces coupled to the circuit board, the circuit board being mounted to the chassis;
a plurality of memory controllers coupled to the circuit board via the first connection interfaces, the first connection interfaces configured to convey PCIe bus data between respective memory controllers and the circuit board, the second connection interfaces configured to convey PCIe bus data between the circuit board and respective PCIe buses of other computing devices;
a plurality of banks of dual in-line memory module (DIMM) slots configured to place a memory received in a slot in communication with one of the memory controllers; and
one or more processors and system memory coupled to the plurality of memory controllers via the circuit board, the system memory storing computer program instructions configured to cause the one or more processors to effectuate operations comprising:
allocating a first subset of memory coupled to DIMM slots managed by a first memory controller to a first computing device, wherein the first computing device is coupled to a first one of the second interfaces by a first cable among a plurality of cables coupled to respective computing devices, and wherein the first memory controller places in communication, in response to the allocating of the first subset of memory, the first computing device with the first subset of memory; and
allocating a second subset of memory coupled to DIMM slots managed by the first memory controller or a second memory controller to the second computing device, wherein the second computing device is coupled to a second one of the second interfaces by a second cable among the plurality of cables coupled to respective computing devices, and wherein the first memory controller or the second memory controller places in communication, in response to the allocating of the second subset of memory, the second computing device with the second subset of memory.

29. The device of claim 28, wherein:
the chassis comprises three or more receptables accessible via a front of the chassis;
the circuit board mounted to the chassis comprises three or more of the first connection interfaces disposed in spaced relation to each other on the circuit board, each of the three or more first connection interfaces being positioned at a rear of a respective one of the three or more receptacles to blind-mate with a corresponding connection interface disposed at a rear of a front tray for housing memory;
each of the receptacles is configured to receive:
a front tray housing a memory node comprising a memory controller of the plurality of memory controllers and a plurality of DIMMs, or
a memory management node comprising the one or more processors and the system memory; and
a first front tray housing a memory node and a second front tray housing a memory management node each comprise a rear connection interface configured to mate with any one of the first connection interfaces.

30. The device of claim 28, wherein the first subset of memory is allocated to the first computing device in response to a first request, the system memory further comprising instructions to effectuate operations comprising:
receiving a second request from the first computing device for releasing an amount of memory made available to the first computing device; and
de-allocating all or some of the first subset of memory coupled to DIMM slots managed by the first memory controller from the first computing device.

* * * * *